(12) United States Patent
Piwonka et al.

(10) Patent No.: US 6,467,038 B1
(45) Date of Patent: Oct. 15, 2002

(54) METHOD FOR SUPPORTING OPTICAL INTERNATIONAL LANGUAGE MODULES FLASHED INTO ROM

(75) Inventors: Mark A. Piwonka, Tomball; Paul J. Broyles, III, Cypress; Patrick L. Gibbons, Magnolia, all of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/267,547

(22) Filed: Mar. 12, 1999

(51) Int. Cl.$^7$ .................................................. G06F 9/00
(52) U.S. Cl. ........................... 713/1; 713/100; 710/10; 711/170
(58) Field of Search ............................... 713/1, 2, 100; 710/107, 8, 10, 104, 52, 61; 711/154, 170; 709/220

(56) References Cited

U.S. PATENT DOCUMENTS

| | | | | |
|---|---|---|---|---|
| 4,683,469 A | * | 7/1987 | Elsmore et al. | 340/723 |
| 5,060,146 A | * | 10/1991 | Chang et al. | 364/900 |
| 5,091,950 A | * | 2/1992 | Ahmed | 381/51 |
| 5,124,694 A | * | 6/1992 | Dien | 340/750 |
| 5,125,022 A | * | 6/1992 | Hunt et al. | 379/88 |
| 5,251,293 A | * | 10/1993 | Ishii et al. | 395/151 |
| 5,276,793 A | * | 1/1994 | Borgendale et al. | 395/148 |
| 5,337,233 A | * | 8/1994 | Hofert et al. | 364/419.14 |
| 5,682,538 A | * | 10/1997 | Lemire et al. | 707/507 |
| 5,802,482 A | * | 9/1998 | Sun | 704/8 |
| 5,811,779 A | * | 9/1998 | Gaylord, Jr. et al. | 235/462 |
| 5,923,857 A | * | 7/1999 | Pawlowski et al. | 710/107 |
| 6,233,661 B1 | * | 5/2001 | Jones et al. | 711/154 |
| 6,243,701 B1 | * | 5/2001 | Shih et al. | 707/7 |

\* cited by examiner

Primary Examiner—Jeffrey Gaffin
Assistant Examiner—Rijue Mai
(74) Attorney, Agent, or Firm—Conley, Rose & Tayon, P.C.; Jonathan M. Harris

(57) ABSTRACT

A computer system that includes a system ROM with at least two sets of character strings, one set in English and at least one other set in a non-English language. Generally, each set of character strings includes characters, words and phrases that are translations of corresponding character strings in the other sets. In a preferred embodiment, the system ROM includes only two sets of character strings—one English and the other non-English. The non-English set of character strings is included as part of a "language module" stored or flashed into the system ROM. The character strings preferably are used to provide information and instructions to a user during system setup. When setup is run, the computer system determines whether a valid international language module is included in the system ROM. If a valid language module is included, the user is prompted to select either English or whatever international language is provided in the language module. Based on the user's selection for a language, additional information and instructions during setup are shown on the computer's display in the language selected by the user.

20 Claims, 4 Drawing Sheets

METHOD FOR SUPPORTING OPTICAL INTERNATIONAL LANGUAGE MODULES FLASHED INTO ROM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to computer systems with English and non-English language capability. More particularly, the invention relates to an international language module in a ROM device that is used to provide instructions and information on a display to a user to configure the computer.

2. Background of the Invention

Computer manufacturers, such as Compaq Computer Corp., manufacture personal computers that are used all over the world by users who speak a variety of languages. Virtually any language in the world could be the native or preferred language of a computer user. However, there are more than ten languages that are spoken by the majority of all computer users. Such languages include English, German, Finnish, French, Italian, Portuguese, Spanish, Danish, Dutch, Swedish, Norwegian. The present invention addresses the needs of non-English speakers or users that may speak English but prefer a non-English language to use a computer in their preferred language.

When a user turns on a computer for the first time, the computer typically performs a setup routine. The purpose of the setup routine is to configure the computer and the computer's operating system to the particularities or preferences of the user. For example, the setup routine will determine the type of keyboard (U.S., European, etc.) that has been connected to the chassis, the type of monitor, the type of modem, amount of system memory, configure the interrupts, setup the input/output (I/O) ports, and set various other parameters. Further, the setup routine can be re-run during a subsequent boot up, or other event, by pressing a predefined key or key sequence such as <F10> to change or verify the configuration of the computer system.

The setup routine of early personal computers was implemented as an executable file stored on a hard disk drive. Specifically, disk-based setup was stored in an "inactive" partition on the hard disk. An inactive partition is a portion of the disk drive that is generally inaccessible to the user during normal operation, but can be accessed by invoking a particular procedure such as pressing <F10> during boot up. The inactive partition also has been referred to as a "hidden" partition to denote its generally inaccessible nature. Many computer users did not favor the use of hidden partitions, particularly hidden partition for storing the setup routine. These users were concerned about not having full control over the hidden partition, as they had with the active partitions.

An additional concern users had with disk-based setup was the amount of disk space the setup routine occupied. The setup routine occupied disk space that otherwise could have been used for storing data and applications. Initially, disk-based setup routines occupied about 4 megabytes (MB), but recently setup routines have grown to occupy upwards of 20 MB of disk space. Although hard drive capacity also has grown, it still is desirable to free up as much space as possible for data and applications.

At least some computer manufacturers have replaced the hard disk implementation for setup with a ROM-based setup. A "ROM" and is a Read Only Memory device that has the capacity to store a certain number of bytes of data or executable code. Although the storage capacity varies from ROM to ROM, ROM devices typically are capable of storing much less information than hard disks or other types of fixed drives (e.g. CD ROMs). ROM devices generally have a capacity of about 128 Kbytes to 1 Mbytes.

Most personal computers include at least one ROM device referred to as the "BIOS ROM." BIOS stands for Basic Input/Output System and refers to a set of executable routines that the computer's microprocessor can execute to provide low level control over various input/output devices such as hard disk drives, CD ROM drives, keyboards, mouse, and floppy disk drives. The BIOS code generally is permanently stored in the BIOS ROM, although electrically erasable programmable ROMs (EEPROMs) can be used to provide reprogrammable storage for BIOS or other information. Reprogramming a ROM such as an EEPROM usually is referred to as "flashing" the ROM. Copending patent application entitled "Method of Flash Programming or Reading a ROM of a Computer System Independently of its Operating System," U.S. Ser. No. 09/070,823, filed Apr. 30, 1998 discloses an exemplary method for flashing a ROM. The term "ROM" is used throughout this disclosure to refer to any type of non-volatile memory device (i.e., a memory device whose contents remain intact even after power is removed from the device). As such, the term ROM includes ROMs, programmable ROMs (PROMs), EEPROMs, battery backed-up RAM (random access memory) and other non-volatile devices.

The BIOS ROM also contains initialization routines that are executed to boot the computer. The microprocessor executes these initialization routines which test and initialize system memory and various other devices in the computer system. When the boot up process begins, the microprocessor executes the initialization routines directly from the BIOS ROM. That is, each instruction is fetched from the ROM and provided to the microprocessor for execution. In the latter stages of the boot up process, after the system memory is initialized, the BIOS routines are copied to the main system memory (RAM) and are executed from system memory instead of from the BIOS ROM.

Once invoked, the ROM-based setup routine generally requires interaction between the user and the computer. The user, for example, may be prompted to specify, or at least verify, the type of hard drive, amount of memory, and other information. In so doing, the user must read instructions provided on the video monitor which is connected to the computer. Because, as noted above, computers are used by people that potentially speak a variety of languages, it is desirable for the displayed text to be shown in the language most familiar to, or preferred by, the user. Accordingly, it is desirable for the ROM-based setup text to be available in various international languages, besides English. In this disclosure, languages other than English are referred to as international languages.

Several important considerations for computer designers include cost and power. It is preferable for computers to be as low cost as possible and consume as little power as possible. Accordingly, it is preferable for the ROM to be smaller (i.e., have a smaller storage capacity) rather than larger. Smaller ROMs generally are less expensive and consume less power than larger ROMs. The desire for ROM's to be capable of storing all of the desired international languages generally prompts system designers to use undesirably larger and more power hungry and costly ROMs than would otherwise be necessary.

Because of the limited amount of storage capacity of a typical BIOS ROM, it is not desirable, and, in fact, may not be possible to store on the ROM the 12 most widely spoken languages. Nevertheless, there is a need to have a computer system that includes a setup routine whose text can be displayed in any one of a variety of international languages. Despite the advantages such a computer system would offer, to date no such system is known to exist.

BRIEF SUMMARY OF THE INVENTION

The deficiencies of the prior art described above are solved in large part by a computer system that includes a system ROM with at least two sets of character strings, one set in English and the other sets in non-English languages. In a preferred embodiment, the system ROM includes only two sets of character strings—one English and the other non-English. Generally, each set of character strings includes characters, words and phrases that are translations of corresponding character strings in the other sets. Some character strings may be symbols such as punctuation marks (comma, apostrophe, period, etc.) which preferably are included only in the English set of character strings. Further, the ROM preferably is flashable to permit the character strings to be updated as desired.

The non-English set of character strings is included as part of a "language module" flashed into the system ROM. The character strings preferably are used to provide information and instructions to a user during system setup. Setup normally is run when the computer is powered on by the user for the first time, and permits the user to configure the computer system. Setup also can be run at other times by, for example, pressing a hot key such as <F10> during boot up.

In accordance with the preferred embodiment, when setup is run, the computer system determines whether a valid international language module is included in the system ROM. If a valid language module is included, the user is prompted to select either English or whatever international language is provided in the language module. Based on the user's selection for a language preference, additional information and instructions during setup are shown on the computer's display in the language selected by the user.

If the language module is selected, the computer's CPU searches the language module first for a character string that the setup program requests to be displayed. If that character string is not present in the language module, the setup program searches the English character string sets for a corresponding string and uses that string if present. If neither the non-English nor the English string is present, the setup program displays a default error message.

By providing the system ROM with at least two sets of character strings representing at least two different languages, the problems described above regarding conventional computer systems are mitigated or avoided altogether. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

A better understanding of the present invention can be obtained when the following detailed description of the preferred embodiments is considered in conjunction with the following drawings, in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
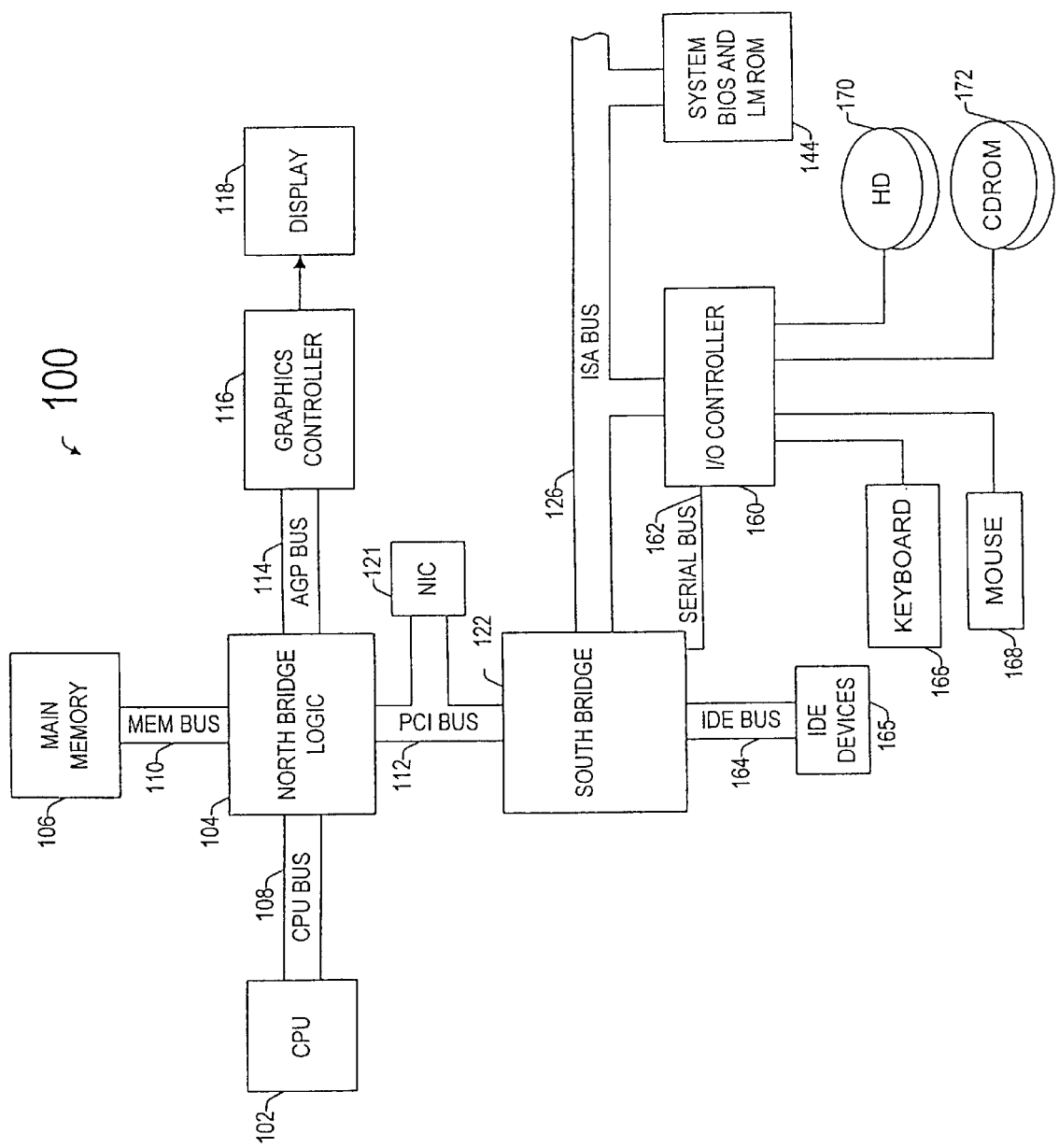
FIG. 1 is a block diagram of a computer system constructed in accordance with the preferred embodiment for implementing multiple language capability in a system BIOS and language module ROM.

Referring now to FIG. 1, a computer system 100 constructed in accordance with a preferred embodiment generally includes a central processing unit ("CPU") 102 coupled to a variety of system components through a "North" bridge logic unit 104. Bridge logic unit 104 is labeled as a "North" bridge to reflect its location at the upper end of the system drawing of FIG. 1. The CPU 102 couples to the North bridge logic unit 104 via a CPU bus 108. Computer system 100 preferably also includes main memory 106, graphics controller 116, display 118, a South bridge 122, an input/output controller 160, a system BIOS and language module (LM) ROM 144 and various other devices as shown. Main memory 106 couples to the bridge logic unit 104 through a memory bus 110, and a graphics controller 116 couples to the bridge logic unit 104 through any suitable graphics bus 114, such as an Advanced Graphics Port (AGP) bus. A display device 118 couples to the graphics controller 116 and receives signals from the graphics controller 116 which control the information shown on the display.

Computer system 100 may be configured in any number of ways, such as a laptop unit, a desktop unit, a network server, or any other configuration. Additionally, the computer system 100 may be implemented in a hand-held computing device.

Referring still to FIG. 1, CPU 102 may be any suitable type of microprocessor such as any microprocessor from the Pentium® family manufactured by Intel® Corp. or the K6® family manufactured by Advanced Micro Devices. It should be understood, however, that other alternative types of microprocessors could be employed. Further, computer system 100 may include only a single CPU (as shown) or include additional CPUs coupled through the CPU bus 108 to the bridge logic unit 104. The Pentium architecture, for example, supports up to four microprocessors.

The main memory 106 generally includes a conventional memory device or array of memory devices in which application programs and data are stored. Main memory 106 preferably includes any suitable type of memory such as dynamic random access memory (DRAM) or any of the various types of DRAM devices such as synchronous DRAM, extended data output DRAM (EDO DRAM), or Rambus™ DRAM.

The graphics controller 116 controls the rendering of text and images on display 118. Graphics controller 116 may embody a typical graphics accelerator generally known in the art to render three-dimensional data structures on display 118. These data structures can be effectively shifted into and out of main memory 106. The graphics controller 116 therefore may assert mastership of the AGP bus 114 in that it can request and receive access to a target interface within the bridge logic unit 104 to thereby obtain access to main memory 106. A dedicated graphics bus 114 accommodates rapid retrieval of data from main memory 106. Display 118 is any electronic display device upon which an image or text can be represented. A suitable display 118 may include, for example, a cathode ray tube (CRT), a liquid crystal display (LCD), a virtual retinal display (VRD), a thin film transistor display (TFT), or any other type of suitable display device for a computer system.

Additionally, one or more peripheral devices couple to North bridge logic unit 104 through a primary expansion bus 112. In the preferred embodiment, the primary expansion bus 112 comprises a Peripheral Component Interconnect (PCI) bus, and accordingly, the peripheral devices are PCI compatible. Two PCI compatible peripheral devices are shown in FIG. 1—a network interface card (NIC) 121 and South bridge logic unit 122 connect to PCI bus 112. NIC 121 provides an interface between computer system 100 and a network (not shown) such as a local area network. If desired, additional PCI devices can be connected to the PCI bus 112, such as video accelerators, audio cards, hard or floppy disk drives, Small Computer Systems Interface (SCSI) adapters and telephony cards. It should be understood, however, that the primary expansion bus 112 may incorporate any suitable expansion bus, network system, or communications channel and may comprise a physical or wireless architecture as desired.

South bridge logic unit 122 bridges the primary expansion bus 112 (the PCI bus) to a secondary expansion bus 126. The secondary expansion bus 126 may be implemented using any suitable bus architecture such as an Industry Standard Architecture (ISA) bus or an Extended Industry Standard Architecture bus (EISA). As the preferred embodiment of FIG. 1 shows, expansion bus 126 is implemented as an ISA bus and, accordingly, all devices connected to the ISA bus are ISA compatible. The input/output (I/O) controller 160 and system BIOS and language module (LM) ROM 144 are shown attached to the ISA bus. The I/O controller 160 may be external from the South bridge 122 (as shown in FIG. 1) or integrated with the South bridge. Generally, the I/O controller 160 provides operational support for a keyboard 166, a mouse 168, hard disk drive 170, CD ROM drive 172, and additional peripheral input/output devices, as desired. The I/O controller 160 generally receives input signals from the keyboard 166 and mouse 168 and provides a data path for data to be stored on or retrieved from the hard disk drive 170 and CDROM drive 172. Other peripheral devices (not shown) also may be connected to the I/O controller 160.

The system BIOS and LM ROM 144 preferably is a non-volatile memory device which contains the system BIOS, setup routines and an international language module. The language module includes one or more sets of alphanumeric character strings in a language other than English. Generally, the language module includes international language translations for English character strings included as part of the setup routine. The language module will be explained in further detail below.

In addition to providing an interface to an ISA or EISA bus 126, south bridge 122 may further incorporate other functionality, as desired. For example, in one embodiment, south bridge 122 includes a master PCI arbiter (not shown) for arbitrating ownership of the PCI bus 112. South bridge 122 may also provide an interface to an IDE bus 164 for coupling IDE-based devices 165 to the south bridge. Examples of IDE devices include hard disk and CD ROM drives.

In accordance with the preferred embodiment, computer system 100 provides the capability to show character strings on display 118 in at least two languages. One of the languages preferably is English and another language can be any other language desired. This "other" language will be referred to as an "international language." The international language character string set is referred to as the "language module" (LM).

The character strings include alphanumeric characters that are shown on display 118 while the setup program is executing, which can be when the computer is turned on for the first time or during subsequent operation as noted previously. The character strings generally provide instructions or information to the user during setup. Table I below includes a non-exhaustive list of exemplary English character strings along with their German translations. In this example, German is the international language.

TABLE I

| | Exemplary English Character Strings. | |
|---|---|---|
| I.D. | English | German |
| 0 | "System Information" | "Systeminformation" |
| 1 | "Display System Information" | "Anzeige Systeminformation" |
| 2 | "Product Name" | "Produktname" |
| 3 | "Processor Type" | "Prozessor" |
| 4 | Processor Speed" | "Prozessorgeschwindigkeit" |

The English and international character strings preferably are stored in the system BIOS and LM ROM 144. Additional character strings in other international languages can also be stored in system BIOS and LM ROM 144 depending on the storage capacity of the ROM. A tradeoff thus can be made between ROM size and the number of international languages stored in the ROM—larger ROM's can accommodate more international languages and smaller ROMs, fewer international languages. Because it generally is desirable for each component in a computer system to consume as little power and be as inexpensive as possible, the preferred embodiment of computer system 100 includes a ROM 144 large enough to hold only one international language character string set. A ROM with this capacity generally will take up less space on the motherboard and consume less power than a ROM with a larger capacity. Accordingly, ROM 144 preferably is a 29F002T ROM manufactured by Advanced Micro Devices, or other suitable device.

Storing just one international language module in system BIOS and LM ROM 144 generally is satisfactory because computer users that prefer languages besides English normally will only need or prefer one international language. The particular international language chosen to be stored in system BIOS and LM ROM 144 can be predetermined at the factory based on to which area or country the computer will be shipped. That is, computers shipped to German speaking countries preferably include German as the international language module and computers shipped to Spanish speaking countries include Spanish as the language module. Other international languages may include Finnish, French, Italian, Portuguese, Danish, Dutch, Swedish, and Norwegian, or other languages or dialects as desired.

Figure 2:
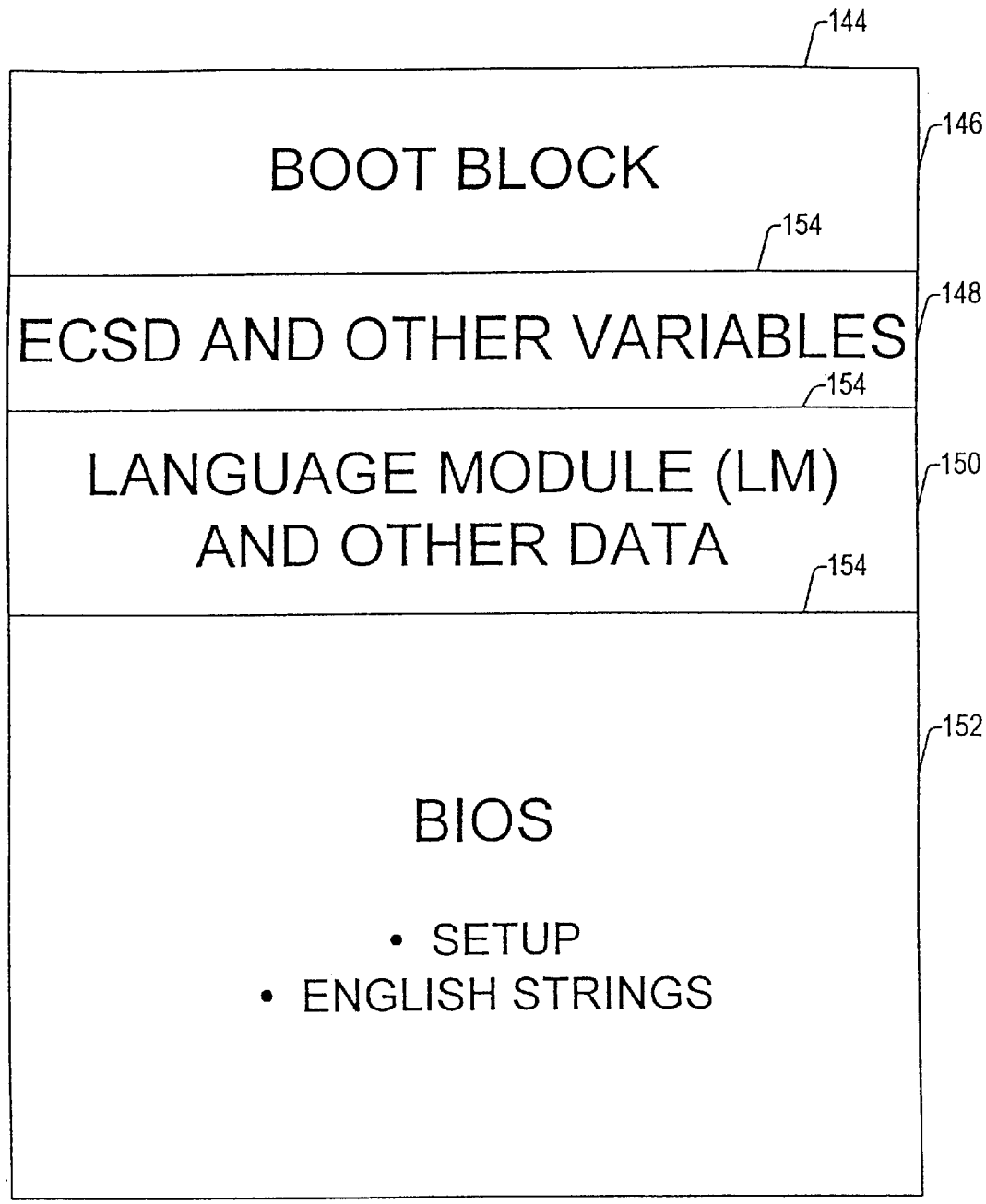
FIG. 2 shows the contents of the system BIOS and language module ROM.

Referring now to FIG. 2, system BIOS and LM ROM 144 preferably includes a boot block 146, an extended system configuration data (ECSD) and other variables portion 146, a LM 150, and the system BIOS 152. The BIOS portion 152 preferably includes the system BIOS as well as the setup program and English character strings introduced above. ROM devices usually are configured as multiple "sectors" and each of the various portions 146–152 may be stored in one or more sectors. A sector can be any size such as 8 KB (kilobytes). The lines 154 separating the portions 146–152 do not necessarily represent sector boundaries. A sector may contain parts of two or more different portions 146–152. For example, the LM 150 may be stored in one or more sectors. One or more of those sectors may include a portion of the LM along with other information listed generically as "other data" in FIG. 2.

In accordance with the preferred embodiment, each English and international language character string is assigned a unique, preferably numeric, identifier. Referring back to Table I above, for example, each of the five character strings shown in each language are associated with an identification (I.D.) value 0–4. As new character strings are created, the new strings preferably are appended to the end of the existing set of strings, and thus are assigned the next available numeric identification value. Each character string preferably ends with a predefined character, such as the "NULL" character which has been assigned the ASCII code 0. "ASCII" stands for American National Standard Code for Information Interchange and includes a unique industry standard numeric code for each alphanumeric character on a typical keyboard, as well as other characters not on the keyboard. Further, the character strings have variable length. That is, the length of each string may be different than the length of other strings. Preferably, the English and international language character strings are stored in I.D. number order and preferably without the I.D. value itself. As such the string assigned I.D. value 0 is stored first followed by the string assigned I.D. value 1, and so on. Because the I.D. values themselves are not stored in ROM 144, significant storage space savings are realized. For example, if the language module includes 500 international language character strings which are assigned to 500 different I.D. values, not storing the I.D. values saves 1000 bytes of storage space in the ROM. Alternatively, the strings can be flashed into the ROM 144 along with their I.D. values. Additionally, the entire LM may be compressed using any one of a variety of known compression techniques and stored as a compressed image in the ROM 144. For LM strings to be used from the ROM, the CPU decompresses the LM and the selects the individual strings as needed.

In accordance with the preferred embodiment of the invention, each of the portions 146–152 can be selectively reprogrammed or the entire ROM 144 can be reprogrammed. Reprogramming the ROM 144 is desirable if the user wishes to substitute in character strings in a different international language or wishes simply to add to or modify the existing set of international language strings. New character strings preferably are assigned the next available I.D. and are appended to the end of the existing set of character strings.

Reprogramming all or a portion of the ROM 144 is referred to as "flashing" the ROM and the preferred embodiment includes any suitable technique for flashing the ROM. A suitable example for flashing a ROM is described in copending and commonly assigned patent application entitled "Method of Flash Programming or Reading a ROM of a Computer System Independently of its Operating System," U.S. Ser. No. 09/070,823, filed Apr. 30, 1998, incorporated herein by reference. The new ROM "image" (i.e., the information to be reprogrammed into the ROM) may be provided in any suitable manner to the computer system 100 such as copied from a floppy disk or downloaded from a network resource such as the Internet.

If less than an entire sector is to be flashed, computer system 100 preferably performs a "read-modify-write" to retain the portion of the sector that is not changed by flashing and update the portion that is flashed. Read-modify-write flashing permits, for example, just the LM to be updated with new strings or revisions to the old strings, if the LM occupies a sector with other types of data not related to the LM per se. By way of example, if a sector includes two portions A and B, and only portion B is to be updated during the flash, the entire sector first is copied to a buffer in main memory 106. Then, portion B is updated with the new data and the contents of the memory buffer (which include old portion A and updated portion B) are flashed back into ROM 144. Any suitable technique for permitting the user to update the language module is acceptable. For example, the user may run the ROMPAQ utility from Compaq Computer Corp. to update the system ROM 144. Suitable software for updating the LM is shown below preceding the claims.

Figure 3:
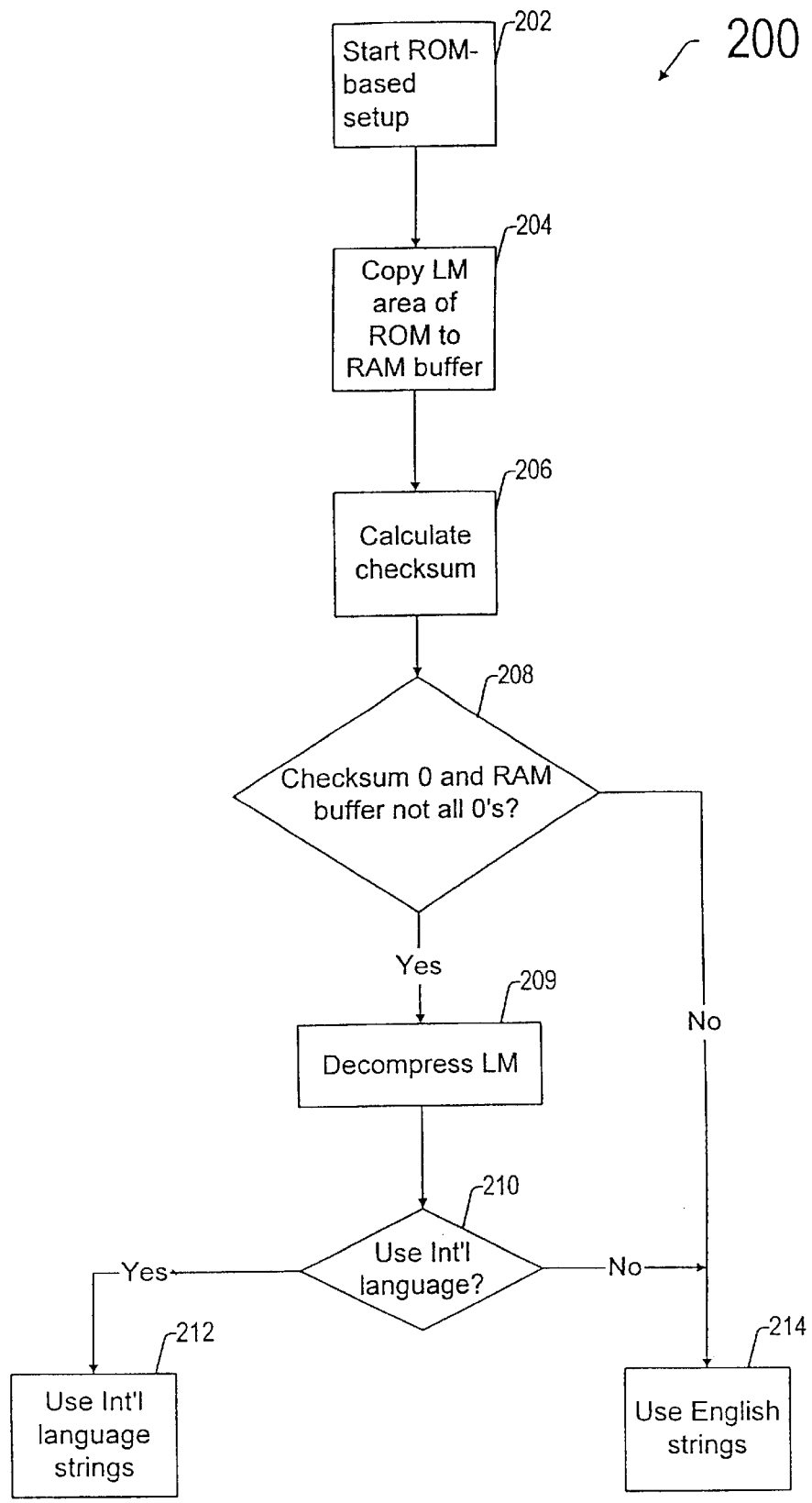
FIG. 3 shows a preferred method for configuring the computer system to use either the language module character strings or English character strings from the system BIOS and language module ROM.

Referring now to FIG. 3, an exemplary method 200 is shown for determining whether English or the LM is to be used during setup. It should be understood that there are numerous other techniques for selecting a language for setup besides that shown in FIG. 3. The method 200 shown in FIG. 3 represents one possible selection method. In step 202, ROM-based setup is started. This step may be performed automatically the first time computer system 100 is turned on. Further, step 202 may be performed each time the computer boots up by pressing a predefined key or key combination, such as <F10>, during the boot up process.

In step 204, the LM portion of the ROM 144 is copied to a buffer in main memory 106. A checksum preferably is calculated for the LM in step 206 to help ensure that the LM is present and contains valid data. Calculating a checksum is a known technique for adding or otherwise combining the contents of a set of memory locations together and ignoring any carry over bits. The exclusive OR operation may be used instead of adding. For example, if a set of 8-bit memory locations are added together, the result may be a 9-bit number. The most significant bit (the $9^{th}$ bit) is ignored or truncated and the checksum result is only the least significant 8 bits. In accordance with the preferred embodiment, a checksum is calculated for the LM by adding together the memory locations of the main memory 106 buffer that contains the LM. The checksum preferably is 0. A 0 checksum can be ensured by including an extra data value that when added to, or otherwise combined with, the rest of the LM data results in a checksum of 0. The process for ensuring a particular checksum occurs during the design of and initial program load of ROM 144. Further, the checksum can be preset to be any value besides 0, if desired.

In decision step 208, the checksum calculated in step 206 is compared to its preset value, which in the preferred embodiment is 0. If one or more bits or values in the LM changes or otherwise becomes corrupted, the checksum calculated in step 206 will not equal the preset value of 0, and program control uses only the English strings in step 214. Further, even though the checksum equals 0, it still may be desirable not to use the international LM because the LM portion of the BIOS ROM may contain all 0 values (i.e., the LM was never programmed with international language character strings). Thus, decision step 208 also determines whether the LM portion copied to the main memory buffer in step 204 contains all 0 values. If the LM is, in fact, all 0's, the English strings are used (step 214).

Alternatively, if the result of decision step 208 is that the LM checksum is correct (0) and the LM does not contain all 0 values, the LM is decompressed in step 209 and the user is prompted in step 210 to answer the question whether the user wishes to have the international language character strings shown on display 118. If the user answers that question affirmatively, then all future setup program character strings are displayed in the international language provided in the ROM's LM as shown in step 212. On the other hand, even though the computer may include a valid LM, the user still may prefer for the computer system 100 to display English character strings, rather than the international language strings.

Once the language module has been selected to use during setup, computer system 100 uses the international language character strings included in the ROM-based language module. One exemplary embodiment for using the language module strings is illustrated in the flow chart 300 of FIG. 4. In this exemplary method, the CPU 102 is provided with an I.D. value for a desired string in the ROM-based language module and the CPU retrieves the appropriate string. In step 302, the CPU 102 searches the language module for the specified string using any suitable method. One possible method includes searching the language module for the NULL characters which terminate each character string and counting the NULL characters encountered until the target string is found. For example, if the requested string has an I.D. value of 8, the CPU 102 searches for and counts eight NULL characters. The string that begins immediately following the eighth NULL character has an I.D. value of 8 and is the target string. Decision step 302 results in a "yes" response if the requested language module string is present and a "no" response if the language module string is not present. If desired, the language module can be terminated with a predefined character or value to signify the end of the language module. Accordingly, if the CPU continues searching for and counting NULL characters and reaches the character that terminates the language module, the CPU determines in step 304 that the language module does not contain the requested character string.

If the requested language module string is present, as determined by decision step 304, then, in decision step 306, the CPU determines whether that string has a length greater than zero bytes. A zero-length character string means that string has not been defined yet or translated into the international language. If the requested language module string has a length greater than zero, then CPU 102 selects that string in step 308 to be displayed on display 118.

If the CPU 102 determines in decision step 306 that the requested language module string is present but has a length of zero bytes or if the CPU determines in decision step 304 that the requested language module string was not present, the CPU then determines in decision step 310 whether the English version or translation of the string is present in the ROM 144. If the English string is present, CPU 102 selects that string to be shown on display 118 in step 312. If the English string is not present in ROM 144, however, CPU 102 in step 314 selects a default string from ROM 144 that can be any desired message such as "** Missing String **."

Figure 4:
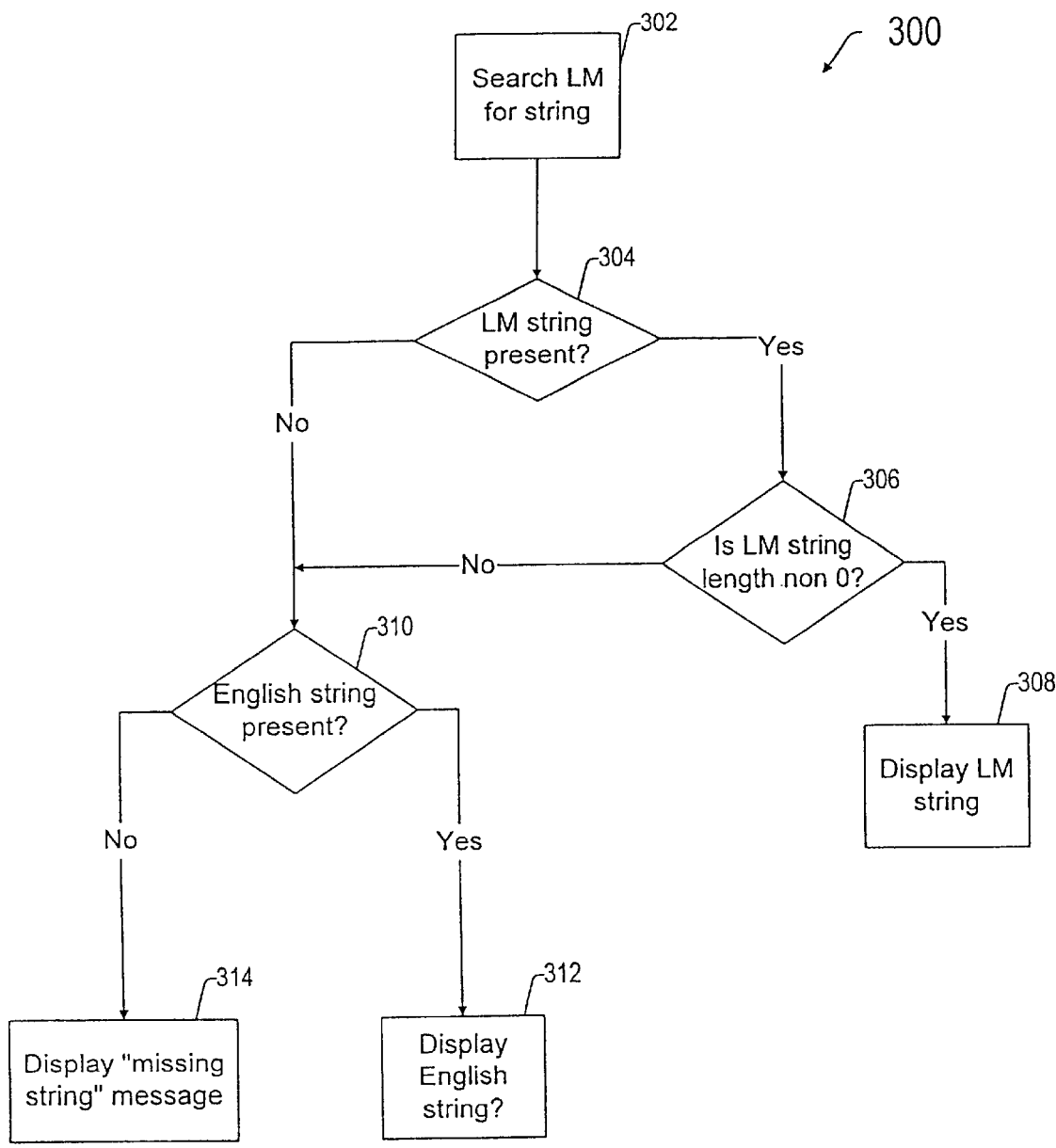
FIG. 4 shows a preferred method for selecting for display either an international language or English character string from the system BIOS and language module ROM.

A exemplary source code listing for the implementation of method 300 shown in FIG. 4 is provided below. Non-executable comments are included following the semicolons for convenience in reading and understanding the code.

```
;GetIDStringPtr
;      Description:   Get the pointer to string [ID]
;      Entry:         SI = string ID of <NULL> terminated string
;      Exit:          SI = pointer to >NULL> terminated string
;      Regs:          None
GetIDStringPtr proc near
       push    ax
       push    cx
       push    di
       push    es
       push    cs                             ; setup ES
       pop     es
       mov     di, [bp+MenuTextPtr]           ; DI = text string start
       xor     ax, ax                         ; search for null terminator
GetIDStrEnglish:
       mov     cx, si                         ; # Strings to search
       jcxz    CheckIDStrValid                ; if ID==0, then get ptr
GetIDStrLoop:
       cmp     word ptr [di], TableEndID      ; Q: End of String ID/Text table?
       je      searchEnglishText              ; Y: go check English Text
       push    cx
       mov     cx,500                         ; N: find end of string (max 500 chars)
       repne   scasb                          ; find <NULt> terminator
       pop     cx
       loop    GetIDStrLoop
CheckIDStrValid:
       cmp     word ptr [di],TableEndID       ; Q: End of String ID/Text table?
       je      searchEnglishText              ; Y: go check English Text
       cmp     byte ptr [di], 0               ; Q: String Length = 0?
```

-continued

```
        jne     GetIDStrExit            ; N: got a string
                                        ; Y: try English Text
searchEnglishText:
        cmp     di, XLATE_OFFSET        ; Q: Within English Text table?
        jb      GetIDStrMissing         ; Y: then use "String is Missing"
        mov     di, offset MenuTextStart ; N: then try the English table
        jmp     GetIDStrEnglish
GetIDStrMissing:
        mov     di, offset MissingStr   ; display '**** Missing String ****'
GetIDStrExit:
        mov     si,di                   ; SI = string [ID] pointer
        pop     es
        pop     di
        pop     cx
        pop     ax
        ret
GetIDStringPtr  endp
```

The following source code provides an exemplary software embodiment for flashing a ROM with an image that includes an LM and performs a read-modify-write method as noted above.

```
        Page    58,132
        Title   sprod.ASM
        Subttl  Copyright (c) 1982-98 COMPAQ Computer Corporation
;*******************************************************************************
;       Name:       sprod.ASM
;       Group:      ROM
;       Revision:   A.0
;*******************************************************************************
;
        Module Functional Description:
        This module contains product-specific SMI FLASH functions.
;*******************************************************************************
        .xlist
        include gmasm61.mac             ; MASM 6.1 Compatibility
        include gsegment.mac            ; Segment Definition macros
        include gopcode.mac             ; Extra Opcode Support Macros
        include . . . \prj\gproddef.equ; Product support equates
        .list
        SEGMENT_SMI_MODEL
        SEGMENT_SMI_CPU
;*******************************************************************************
;
;       Local Include Files
;*******************************************************************************
        .xlist
        include security.equ
        include . . \prj\gproddef.equ
        include . . \hw\flash\nvsflash.equ
        include . . \prj\nvs\nvs.equ
        include . . \core\smi\gsmicore.equ
        include . . \msc\glayout.equ
        .list
;*******************************************************************************
;       PUBLICS
;*******************************************************************************
        public romflash
;*******************************************************************************
These equates are system dependent and need to be updated when
the configuration of the ROM device changes
;*******************************************************************************
ROM_256KB_SIZE                  equ     256     ; 256KB flash ROM size in
KBytes
ROM_DATE_SEG            equ             0F000h ; Segment of ROM date string
ROM_DATE_OFF            equ             0FFF5h ; Offset of ROM date string
LANG_ID                 equ             'L'    ;
LANG_DATE               equ             3      ; offset of date string in LM
; Unused space in SMRAM (may have to be split into several chunks)
RMW_FLASH_BUFFER        equ     (0b8000h - 32 * 1024)
RMW_BUFFER_SIZE         equ     32 * 1024
RMW_FLASH_BUFFER2       equ     0
RMW_BUFFER_SIZE2        equ     0
header_id_lo            equ     'IMOR'  ; *ROMIMAGE
header_id_hi            equ     'EGAM'
ROMPAQ input and output status masks
ROM_CORRUPT             equ     0001h
TEST_MODE               equ     0002h
CANCELLED               equ     0004h
ITERATE                 equ     0008h
FACTORY_MODE            equ     0010h
MAKE_BACKUP             equ     0020h
REBOOT                  equ     0040h
```

-continued

```
INCOMPATIBLE          equ      0080h
MIN_INDEX             equ      0100h
ERROR                 equ      8000h         ; unspecified error
LOCK_ERROR            equ      8001h         ; could not unlock part
image_header          struc
    ID_LO             dd       ?             ; Signature of header 'ROMI'
    ID_HI             dd       ?             ; ... 'MAGE'
    IMAGE_ADDR        dd       ?             ; Flat address of image buffer
    IMAGE_OFF         dd       ?             ; Offset of image into ROM
    IMAGE_LEN         dd       ?             ; Image length in bytes
    COMMAND           dw       ?             ; Command
    RESULT            dw       ?             ; Return code
    PW_LO             dd       ?             ; 4 bytes of PW
    PW_HI             dd       ?             ; 4 bytes of PW
    MSG_DIGEST_0      dd       ?             ; MD5 message digest bytes 0 ... 3
    MSG_DIGEST_1      dd       ?             ; MD5 message digest bytes 4 ... 7
    MSG_DIGEST_2      dd       ?             ; MD5 message digest bytes 8 ... 11
    MSG_DIGEST_3      dd       ?             ; MD5 message digest bytes 12 ... 15
image_header          ends
; Command field values. These match ROMPAQ
QUERY_CMD                      equ    0
INIT_CMD                       equ    1
BACKUP_CMD                     equ    2
FLUSH_CMD                      equ    3
LANG_FLASH_CMD                 EQU    4              ; flash language module
LANG_BACKUP_CMD       EQU      5                     ; BACKUP language module
LANG_QUERY_CMD                 EQU    6
LANG_INIT_CMD                  EQU    7
FLUSH_CMD                      EQU    8
NULL_CMD                       equ    0FFh
SEGMENT_RUNTIME_START
    EXTERNDEF                  rhwFlashEnable:near       ; RHWVT586.ASM
    EXTERNNDEF                 rhwFlashDisable:near      ; RHWVT586.ASM
SEGMENT_RUNTIME_END
;*******************************************************************
;       CODE SEGMENT
;*******************************************************************
SEGMENT_SMI_START
    EXTERNDEF                  sromgate:near
    extrn                      prog_Am29F002T:near       ; snvsfish.asm
;       PUBLICS
;*******************************************************************
;       CODE
;*******************************************************************
IFDEF SMI_FLASH_SUPPORT
    IF SMI_FLASH_SUPPORT
;*******************************************************************
;       find_image_header: Search through memory for image header
;       Entry:                  None
;       Exit:                   es:edi = flat address of header 0:xxx,
;                                        or NULL if not found 0:0
;       Modifies: none
;---------------------------------------------------------------------
find_image_header proc near
        cld
        mov     eax, header_id_lo
        mov     edx, header_id_hi
        mov     edi, cs:last_addr
        cmp     eax, es:[edi]
        jne     begin_search
        add     edi, 4
        cmp     edx, es:[edi]              ; found upper 32 bits?
        je      found
begin_search:
        xor     edi, edi
        mov     es, di                     ; ES:EDI = 0:0
        mov     eax, header_id_lo
        mov     edx, header_id hi
        mov     ecx, 32 * 1024 * 1024; Up to 32M
find loop:
        ASP                                ; 32-bit addressing
        scasd   es:[edi]                   ; es:[edi] == eax?
        je      find_upper
        cmp     edi, ecx
        je      not_found
        jmp     short find_loop
find upper:
        cmp     edx, es:[edi]              ; found upper 32 bits?
        je      found                      ; Yes
```

-continued

```
            jmp         short find_loop
not_found:
            xor         edi, edi                        ; Not found
            ret
found:
            sub         edi, 4
            mov         cs: last_addr, edi; save for next time
            ret
find_image_header endp
;****************************************************************************
;       romflash: Flash or backup the ROM image
;       Entry:                          None
;       Exit:                           None
;       Modifies: ROM image or user backup image buffer.
;---------------------------------------------------------------------------
save_61         db      0       ; save port 61
write_pending   db      0
last_addr       dd      0
romflash proc near
; Find the image header (provided by caller) in memory.
            call        find_image_header; es = 0
            or          edi, edi                        found?
            je          find_error                      ; No
; Now, see what we are supposed to do . . .
            push        edi                             ; save ptr to header
            mov         ax, es: [edi].COMMAND           ; get command
            cmp         ax, QUERY_CMD                   ; ROMPAQ query?
            je          process_query
            cmp         ax, INIT_CMD                    ; ROMPAQ driver init?
            je          process_query
            cmp         ax, BACKUP_CMD                  ; Backup ?
            je          process_backup
            cmp         ax, FLASH_CMD                   ; Flash?
            je          process_flash
            cmp         ax, LANG_FLASH_CMD; Flash lang module?
            je          prccess_lang_flash
            cmp         ax, LANG_QUERY_CMD; ROMPAQ query?
            je          process_lang_query
            cmp         ax, LANG_INIT_CMD; ROMPAQ driver init?
            je          process_lang_query
            cmp         ax, LANG_BACKUP_CMD             ; Backup ?
            je          process_lang_backup
            cmp         ax, FLUSH_CMD
            je          process_flush                   ; flush pending writes
            cmp         ax, NULL_CMD                    old header?
            je          process_null
            jne         find_error                      ; unknown command
; flash a portion of the system ROM
process_flash:
            call        unlock_flash
            mov         ax, LOCK_ERROR
            jc          report_error
; Read data from header
            mov         ecx, es: [edi].IMAGE_LEN ; size of image buffer
            mov         esi, es: [edi].IMAGE_ADDR; address of image buffer
            cmp         esi, 0ffffffffh ; buffer follows header?
            jne         calc_start                      ; No
            mov         esi, edi                        ; Yes, get header ptr
            add         esi, size (image_header); + size of header
calc_start:
            mov         edi, es: [edi].IMAGE_OFF ; offset into RQM
            add         edi, ROM_START_4GB; Absolute address of 29E002T flash ROM
;;;;;;;;;;;;;;;;;;;;;;;;;;;;;;;;;;;;;;;;;;;;;;;;;;;;;;;;;;;;;;;;;;
; Make sure size is OK
            xor         ax, ax                          ; (report no error)
            or          ecx, ecx                        ; is size 0?
            je          report_error                    ; Yes, don't continue
; check for data going past end of ROM
            mov         eax, edi                        ; get starting address
            add         eax, ecx                        ; plus length
            cmp         eax, ROM_START_4GB; start of flash device
            jb          report_error                    ; address wrapped!
; check for data in language sector of flash part
            push        eax
            smfcall rhwFlashEnable                      ; Open up F0000h & Enable Writes
            in          a1,061h                         ; use speaker timer for our timing
            mov         cs:save_61, a1
            or          a1,00000001b                    ; enable timer
            and         a1,11111101b                    ; disable speaker
```

-continued

```
        out     C61h,al
        pop     eax
        cmp     eax, LANG_SEG_START     ; cmp with lang seg start addr
        jbe     not_in_lang             ; below, no part in lang- go flash
        cmp     edi, LANG_SEG_START     ; what about beginning?
        jae     lang_only               ; all data in lang seg only
; some data below lang seg, some in lang seg
        mov     eax, LANG_SEG_START
        sub     eax, edi                ; size of chunk below lang seg
        pushad
        mov     ecx, eax                ; size of chunk below lang seg
        call    prog_Am29F002T          ; program ROM below lang seg
        popad                           ; restore regs
        jc      cleanup_flash
        sub     ecx, eax                ; remaining chunk size
        add     esi, eax                ; new starting address - data
        add     edi, eax                ; new starting address - ROM
lang_only:
; make sure data does not go into lang module/escd/BB
        cmp     edi, LANG_SEG_START + LANG MODULE_OFFSET ; starts past end?
        jae     past_end                ; done
        mov     eax, edi                ; get start
        add     eax, ecx                ; add size
        cmp     eax, LANG_SEG_START + LANG_MODULE_OFFSET ; past end?
        jbe     do_lang                 ; not include escd, bootblk?
        sub     eax,
LANG_SEG_
START +
LANG_MOD-
ULE_OFFSET ;
past end?
        sub     ecx, eax                ; adjust the size
do_lang:
        call    prog_lang_sect          ; program data in lang sector
        jmp     cleanup_flash           ; done
past_end:
        clc
        jmp     cleanup_flash
not in_lang:
;;;;;;;;;;;;;;;;;;;;;;;;;;;;;;;;;;;;;;;;;;;;;;;;;;;;;;;;;;;;;;;;;;;;
        call    prog_Am29F002T          ; program flash!
cleanup_flash:
        pushf                           ; save cf
        smfcall rhwFlashDisable ; disable ROM writes
        mov     a1, cs:save 61
        out     61h, a1
        popf                            ; restore cf
        jc      have_error
        xor     ax, ax                  ; no error
        jmp     report_error            ; error?
have_error:
        or      ax, ERROR               ; yes, error
; This label is common to all of the subsections of this function
report_error:
        pop     edi                     ; ptr to image header
        mov     es: [edi].result, ax    ; store result code
        jmp     flash_done              ; clean up and exit
;****************************************************************
;
; flash language support only
process_lang_flash:
        call            unlock_flash
        mov     ax, LOCK_ERROR
        jc      report_error
; Read data from header
        mov     ecx, es: [edi].IMAGE_LEN ; size of image buffer
        mov     esi, es: [edi].IMAGE_ADDR; address of image buffer
        cmp     esi, 0ffffffth ; buffer follows header?
        jne     @f                      ; No
        mov     esi, edi                ; Yes, get header ptr
        add     esi, size (image_header); + size of header
@@:
        mov     ebx, es:[edi].IMAGE_OFF ; offset into ROM
        in      a1,061h                 ; use speaker timer for our timing
        mov     cs:save_61, al
        or      a1,00000001b            ; enable timer
        and     a1,11111101b            ; disable speaker
        out     061h,a1
        call    load_scratch            ; load scratch buffer if at start addr
```

-continued

```
; now fill in lang module section       ;
        mov     edi, RMW_FLASH_BUFFER +
LANG_MODULE_OFFSET ; scratch buffer
        add     edi, ebx                ; add offset from caller
        push    ecx                     ; save length
        ASP                             ; 32-bit addressing
        rep movs BYTE PTR es: [edi], es: [esi] ; copy ES:ESI to ES:EDI
        pop     ecx                     ; restore length
        inc     BYTE PTR cs:write_pending
        cic                             ; indicate no error
        jmp     cleanup_flash           ; cleanup_flash will use our saved ax
;******************
; process_backup:
        smtcall rhwFlashEnable          ; Open up F0000h & Enable Writes
        mov     ecx, es: [edi].IMAGE_LEN ; size of image buffer
        mov     esi, es: [edi].IMAGE_OFF ; offset into ROM
        mov     edi, es: [edi].IMAGE_ADDR ; address of image buffer
        add     esi, ROM_START_4GB ; Absolute address of 29F002T flash ROM
        cld                             ;
        ASP                             ; 32-bit addressing
        rep movs BYTE PTR es: [edi], es: [esi]; copy ES:ESI to ES:EDI
        smfcall rhwFlashDisable ; disable ROM writes
        xor     ax, ax                  ; no error code
        jmp     report error            ; done
process_lang_backup:
        smfcall rhwFlashEnable          ; Open up F0000h & Enable Writes
        mov     ecx, es: [edi].IMAGE_LEN ; size of image buffer
        mov     esi, es: [edi].IMAGE_OFF ; offset into ROM
        mov     edi, es: [edi].IMAGE_ADDR; address of image buffer
        add     esi, LANG_SEG_START + LANG_MODULE_OFFSET; Absolute address
of 29F002T flash ROM
        cmp     ecx, LANG_MODULE_SIZE
        jbe     lang_backup
        mov     ecx, LANG_MODULE_SIZE
lang_backup:
        cld                             ;
        ASF                             ; 32-bit addressing
        rep movs BYTE PTR es:[edi], es: [esi] ; copy ES:ESI to ES:EDI
        smfcall rhwFlashDisable ; disable ROM writes
        xor     ax, ax                  ; no error code
        jmp     report_error            ; done
process_query:
; Put Misc id data into fields of header
        pop     edi                     ; ptr to image header
        mov     eax, 0                  ; min_ndx
        mov     es: [edi].IMAGE_OFF, eax
        mov     eax, (ROM_256KB_SIZE SHL 16) + 64 ; rom size + load_size
        mov     es: [edi].IMAGE_LEN, eax
        mov     eax, (ROM_DATE_SEG SHL 16) + ROM_DATE_OFF
        mov     es: [edi].IMAGE_ADDR, eax
        mov     eax, ROMPAQ_ID_LO
        mov     es: [edi].MSG_DIGEST_0, eax
        mov     eax, ROMPAQ_ID_HI
        mov     es: [edi].MSG_DIGEST_1, eax
        push    edi                     ; gets popped in report_error!
        xor     ax, ax                  ; no error code
        jmp     report_error            ; done
process_lang_query:
; Put Misc id data into fields of header
        smfcall rhwFlashEnable          ; Open up F0000h & Enable Writes
        pop     edi                     ; ptr to image header
        mov     eax, 0                  ; min_ndx
        mov     es: [edi].IMAGE_OFF, eax
        mov     eax, ((LANG_MODULE_SIZE / 1024) SHL 16) + 0 ; rom size +
load_size
        mov     es: [edi].IMAGE LEN, eax ; image len in KBytes
; check if the language module is valid, if not set date string to 0
        mov     esi, LANG_SEG_START + LANG_MODULE_OFFSET
        mov     ax, es: [esi]           ; get the 1st word
        or      ax, ax                  ; is it zero?
        je      no_lang                 ; yes no lang module present
        inc     ax                      ; if FFFF, ax <- 0
        or      ax, ax                  ; is it zero?
        je      no_lang                 ; yes no lang module present
; Load up the date string
        mov     eax, es: [esi + LANG_DATE]
        mov     es: [edi].MSG_DIGEST_2, eax
        mov     eax, es: [esi + LANG_DATE + 4]
        mov     es: [edi].MSG_DIGEST_3, eax
```

```
; process the lang abbrev chars in ROMPAQ ID
        xor     eax, eax                    ; zero eax
        mov     ax, es: [esi + LANG_DATE + 8]   ;get language name bytes
        shl     eax, 8                      ; shift into place
        jmp     process_id
no_lang:
; Set the date string to NULLs
        xor     eax, eax
        mov     es: [edi].MSG_DIGEST_2, eax ; date is zero
        mov     es: [edi].MSG_DIGEST_3, eax
process_id:
        mov     a1, LANG_ID                 ; 'L'
        mov     es: [edi].MSG_DIGEST_1, eax ; put it in header
        mov     eax, ROMPAQ_ID_LO
        mov     es: [edi].MSG_DIGEST_0, eax
        smfcall rhwFlashDisable ; disable ROM writes
        push    edi                         ; gets popped in report_error?.
        xor     ax, ax                      ; no error code
        jmp     report_error                ; done
process_flush:
        cmp     BYT PTR cs:write_pending, 0
        je      no_flush
        call    unlock_flash
        mov     ax, LOCK_ERROR
        jc      report_error
        smfcall rhwFlashEnable              ; Open up F0000h & Enable Writes
        in      a1,061h                     ; use speaker timer for our timing
        mov     cs:save_61, a1
        or      a1,00000001b                ; enable timer
        and     a1,11111101b                ; disable speaker
        out     061h,a1                     ;
        call    prog_scratch                ; write out entire sector (set cf)
        mov     BYTE PTR cs:write_pending, 0
        jmp     cleanup_flash
no_flush:
        xor     ax, ax
        jmp     report_error                ; done
process_null:
        mov     ax, ERROR                   ; error, stale header
        jmp     report_error                ; done
find_error:
        pop     edi                         ; correct stack
flash_done:
        ret
romflash endp
;--------------------------------------------------
; prog_lang_sect
;       perform read/modify/write of flash sector containing language
;       module, so that lang. module is not overwritten.
; Input:
;       edi - address to be flashed
;       esi - user's buffer addr
;       ecx - length of buffer
; Output:
;       flash updated
;---------------------------------------------------------------------------
prog_lang_sect proc near
; address fails out of range?
        cmp     edi, LANG_SEG_START + LANG_MODULE_OFFSET
        ja      lang_flash_error            ; yes, out of range
        call    load_scratch                ;load scratch buffer if at start addr
; Copy user's buffer into scratch
        pushad
        mov     eax, edi                    save flash addr in eax
        sub     edi, LANG_SEG_START         ; edi = offset into lang seg
        add     edi, RMW_FLASH_BUFFER;      + scratch buffer addr
; edi now points to proper place in scratch buffer for user's data
        add     eax, ecx                    ; flash addr + size
        cmp     eax, LANG_SEG_START + LANG_MODULE_OFFSET ; past end?
        jbe     copy_it                     ; no, go do it
        sub     eax, LANG_SEG_START + LANG_MODULE_OFFSET ; eax = overage
        sub     ecx, eax                    ; subtract overage from count
copy_it:
        ASP                                 ; 32-bit addressing
        rep     movs BYTE PTR es: [edi], es: [esi]; copy ES:ESI to ES:EDI
        popad
        inc     BYTE PTR cs:write_pending
        clc                                 ; indicate no error
        ret
```

-continued

```
lang_flsh_error:
        stc                                    ; error
        ret
prog_lang_sect endp
;--------------------------------------------------
; load_scratch
;       load scratch buffer from flash
; Input:
;       edi - address to be flashed
; Output:
;       scratch buffer loaded from flash
;--------------------------------------------------------------------------
load_scratch proc near
; start of sector? If so, copy sector to scratch buffer
        cmp     BYTE PTR cs:write_pending, 0 ; any pending writes?
        jne     not_lang_start
; read the ROM sector containing the language support into a
; scratch buffer.
        pushad
        mov     esi, LANG_SEG_START ; Absolute address lang binary in ROM
        mov     edi, RMW_FLASH BUFFER; scratch buffer
        mov     ecx, LANG_SEG_SIZE
        cld                         ;
        ASP                         ; 32-bit addressing
        rep     movs BYTE PTR es: [edi], es: [esi]; copy ES:ESI to ES:EDI
        popad
not_lang_start:
        ret
load_scratch endp
;--------------------------------------------------
; prog_scratch
;       program scratch buffer to flash
; Input:
;       None
; Output:
;       cf set if error, clear if OK
; Clobbers esi, edi, ecx
;--------------------------------------------------------------------------
prog_scratch proc near
; program the whole sector
        mov     esi, RMW_FLASH_BUFFER; scratch buffer
        mov     edi, LANG_SEG_START ;Absolute address lang binary in ROM
        mov     ecx, LANG_SEG_SIZE
        call    prog_Am29F002T          ; program flash! (set cf)
        ret
prog_scratch endp
SEGMENT_SMI_END
        End
```

The above discussion is meant to be illustrative of the principles of the present invention. However, numerous variations and modifications will become apparent to those skilled in the art once the above disclosure is fully appreciated. It is intended that the following claims be interpreted to embrace all such variations and modifications.

What is claimed is:

1. A computer system, comprising:

a CPU;

a bus bridge device coupled to said CPU;

a display coupled to said bus bridge device;

a non-volatile memory coupled to said bus bridge device, said non-volatile memory including at least two sets of alphanumeric character strings, each set in a different language, wherein said non-volatile memory is a ROM;

wherein said CPU is programmed to computer a checksum for one of the sets of alphanumeric character strings to be used to determine the validity of the character string; and wherein said ROM is configured as a plurality of sectors and said ROM contains a flashing program that performs a read-modify-write flashing operation by which the entire contents of the sectors containing the language module is read from said ROM and copied to main memory, and modifications are made to the language module in main memory and the contents of the sectors are flashed back into said ROM.

2. The computer system of claim 1 wherein said non-volatile memory includes only two sets of alphanumeric character strings.

3. The computer system of claim 2 wherein one set of character strings is in English and the other set of character strings is in a language other than English.

4. The computer system of claim 1 wherein said non-volatile memory device also includes a setup program that permits a user to select which of the sets of alphanumeric character strings is to be shown on said display while the setup program is executing.

5. The computer system of claim 1 wherein said non-volatile memory device also includes a system BIOS.

6. The computer system of claim 1 wherein one of the sets of character strings is in a language other than English and the checksum is calculated for that set, said set also includes a value that causes the checksum to be a predetermined value.

7. The computer system of claim 6 wherein the predetermined value is 0.

8. The computer system of claim 6 wherein said CPU is programmed compare the checksum against the predetermined value to determine whether the non-English set of character strings is valid.

9. A method for including multiple language character strings in a computer system, comprising:

(a) programming a read only memory (ROM) with two sets of character strings, one set in English and the other set in a language other than English, wherein said ROM is configured as a plurality of sectors, and said ROM contains a flashing program that performs a read-modify-write flashing operation by which the entire contents of the sectors containing the language module is read from said ROM and copied to main memory, and modifications are made to the language module in main memory and the contents of the sectors are flashed back into said ROM;

(b) querying a user as to whether the user wishes to see the English language character string set or the non-English character string set;

(c) selecting strings from the non-English character string set if the user so specifies in step (b); and (d) calculating a checksum for the non-English set of character strings.

10. The method of claim 9 further including comparing the calculated checksum against a predetermined value to determine if the set of non-English character strings is valid.

11. The method of claim 10 wherein step (b) is performed after determining if the set of non-English character strings is valid.

12. The method of claim 9 wherein step (c) includes:

(c1) searching the set of non-English character strings for a target string; and (c2) displaying the target string.

13. The method of claim 12 wherein the set of non-English character strings are stored in a ROM and are separated by a predefined value and step (c1) includes searching for the predefined values that separate one character string from another.

14. The method of claim 13 wherein the predefined value is a NULL character.

15. The method of claim 9 further including selecting strings from the English set of character strings if the user so specifies in step (b).

16. The method of claim 10 further including selecting strings from the English set of character strings if the calculated checksum is different than the predetermined value.

17. The method of claim 9 further including determining if a non-English character string has a length of 0 and, if so, selecting a corresponding string from the set of English character strings.

18. The method of claim 9 further including determining if a non-English character string exists and, if the non-English string does not exist, selecting an appropriate string from the set of English character strings.

19. A computer system, comprising:

a CPU;

main memory coupled to said CPU;

a ROM device coupled said CPU, said ROM containing system BIOS, English character strings, and an international language module containing character strings in a non-English language;

wherein said ROM is flashable to permit the non-English character strings to be updated independently of the rest of the contents of the ROM; and wherein said ROM is configured as a plurality of sectors and said ROM contains a flashing program that performs a read-modify-write flashing operation by which the entire contents of the sectors containing the language module is read from said ROM and copied to main memory, and modifications are made to the language module in main memory and the contents of the sectors are flashed back into said ROM.

20. A non-volatile memory device, comprising:

an international language module including alphanumeric character strings in a non-English language;

English character strings;

a setup program that selects for display requested non-English alphanumeric characters from the international language module and, if the requested non-English alphanumeric character strings are not available, the setup program selects corresponding English alphanumeric character strings; and a ROM configured as a plurality of sectors, wherein said ROM contains a flashing program that performs a read-modify-write flashing operation by which the entire contents of the sectors containing the language module is read from said ROM and copied to main memory, and modifications are made to the language module in main memory and the contents of the sectors are flashed back into said ROM.

* * * * *

UNITED STATES PATENT AND TRADEMARK OFFICE
CERTIFICATE OF CORRECTION

PATENT NO.    : 6,467,038 B1                                                Page 1 of 1
DATED         : October 15, 2002
INVENTOR(S)   : Mark A. Piwonka, Paul J. Broyles, III and Patrick L. Gibbons It is certified that error appears in the above-identified patent and that said Letters Patent is hereby corrected as shown below:

<u>Title page,</u>
Item [54], correct the title to read as follows:
-- METHOD FOR SUPPORTING OPTIONAL INTERNATIONAL LANGUAGE MODULES FLASHED INTO ROM --

Signed and Sealed this

Twentieth Day of July, 2004

JON W. DUDAS
*Acting Director of the United States Patent and Trademark Office*